United States Patent
Bahl et al.

(10) Patent No.: US 10,795,724 B2
(45) Date of Patent: Oct. 6, 2020

(54) CLOUD RESOURCES OPTIMIZATION

(71) Applicant: Cisco Technology, Inc., San Jose, CA (US)

(72) Inventors: Rohit Bahl, Kanata (CA); Debashish Ghosh, Kanata (CA); Stephen Williams, Stittsville (CA)

(73) Assignee: Cisco Technology, Inc., San Jose, CA (US)

( * ) Notice: Subject to any disclaimer, the term of this patent is extended or adjusted under 35 U.S.C. 154(b) by 173 days.

(21) Appl. No.: 15/905,847

(22) Filed: Feb. 27, 2018

(65) Prior Publication Data
US 2019/0266014 A1 Aug. 29, 2019

(51) Int. Cl.
*G06F 9/48* (2006.01)
*G06N 5/04* (2006.01)
*G06F 9/50* (2006.01)
*G06N 20/00* (2019.01)

(52) U.S. Cl.
CPC ........... *G06F 9/4881* (2013.01); *G06F 9/505* (2013.01); *G06N 5/04* (2013.01); *G06N 20/00* (2019.01)

(58) Field of Classification Search
CPC .................................................. G06F 9/4881
See application file for complete search history.

(56) References Cited

U.S. PATENT DOCUMENTS

| | | | | |
|---|---|---|---|---|
| 2005/0268299 | A1* | 12/2005 | Picinich | G06F 9/485 718/100 |
| 2009/0094607 | A1* | 4/2009 | Indei | G06F 3/1296 718/102 |
| 2011/0154358 | A1 | 6/2011 | Di Balsamo et al. | |
| 2016/0110227 | A1* | 4/2016 | Ono | G06F 9/45558 718/1 |
| 2016/0170801 | A1* | 6/2016 | Di Balsamo | G06F 9/4887 718/104 |
| 2016/0328273 | A1 | 11/2016 | Molka et al. | |
| 2018/0046505 | A1* | 2/2018 | Saga | G06F 9/4881 |
| 2018/0181415 | A1* | 6/2018 | Balkan | G06F 9/45512 |

(Continued)

FOREIGN PATENT DOCUMENTS

CN 104639626 5/2015

OTHER PUBLICATIONS

Stack, Stack overflow, Apr. 27, 2016 (Year: 2016).*

(Continued)

*Primary Examiner* — Charlie Sun

(57) ABSTRACT

In one embodiment, a system includes: a plurality of cloud nodes implemented on computing devices, the plurality of cloud nodes configured to execute computing jobs in a cloud computing environment according to a schedule, a schedule optimizer configured to: use a machine learning model to determine functional intent for job requests according to at least job execution metadata, and generate a schedule recommendation for jobs associated with the job requests, where the schedule recommendation is generated based at least in part on the functional intent; and a job executor configured to provide the schedule recommendation as the schedule to the plurality of cloud nodes, where the schedule optimizer and the job executor are instantiated in memory and executed by processing circuitry on at least one computing device.

20 Claims, 4 Drawing Sheets

(56) References Cited

U.S. PATENT DOCUMENTS

2019/0130327 A1* 5/2019 Carpenter .............. G06N 20/00

OTHER PUBLICATIONS

Maqableh, Mahmoud et al.; Job Scheduling for Cloud Computing Using Neural Networks (Aug. 20, 2014).
GITHUB; CHRONOS Fault Tolerant Job Scheduler for MESOS (Viewed Jan. 2018).
microsoft.com; Microsoft Azure Batch Documentation (2017).
amazon.com; AWS Batch (2017).
Junipter Networks; APPFORMIX : Intent-Driven Operations for Optimizing Cloud Resources (Viewed Jan. 2018).

* cited by examiner

CLOUD RESOURCES OPTIMIZATION

TECHNICAL FIELD

The present disclosure generally relates to optimizing scheduled use of cloud-based computing resources.

BACKGROUND

In cloud-based computing (or simply: "cloud computing") a cloud network provider provides computing services to one or more users via a group of networked elements that need not be individually addressed or managed by the users. Instead, the computing services are presented to the users as an amorphous cloud, and the cloud provider manages an underlying suite of hardware and software to provide the computing services as per resource requests received from the users. The cloud provider schedules the performance of jobs associated with the resource requests in accordance with details received from the users. For example, in a cloud using Linux nodes, the cloud provider may use cron setup to schedule the jobs to execute on one or more servers at given times of day and/or different days of the week.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Overview

A system includes: a plurality of cloud nodes implemented on computing devices, the plurality of cloud nodes configured to execute computing jobs in a cloud computing environment according to a schedule, a schedule optimizer configured to: use a machine learning model to determine functional intent for job requests according to at least job execution metadata, and generate a schedule recommendation for jobs associated with the job requests, where the schedule recommendation is generated based at least in part on the functional intent; and a job executor configured to provide the schedule recommendation as the schedule to the plurality of cloud nodes, where the schedule optimizer and the job executor are instantiated in memory and executed by processing circuitry on at least one computing device.

DETAILED DESCRIPTION OF EXAMPLE EMBODIMENTS

From a user's standpoint, cloud computing may provide transparent assignment and scheduling of seemingly unlimited computing resources for the performance of user-initiated job requests. However, the cloud provider is tasked with efficiently scaling a multitude of heterogeneously distributed jobs as requested by a large population of users, each job executing with a different periodicity and a different frequency on a cluster of statically assigned cloud resources.

Cloud providers commonly schedule jobs using cron setup on Linux cloud nodes. It will be appreciated by one of ordinary skill in the art that cron setup may not provide a robust solution for changes in any of the characteristics of the scheduled jobs, e.g., duration/periodicity/frequency of jobs and/or onboarding and/or off boarding of associated cloud resources for execution of the jobs. Such changes may therefore present significant orchestration challenges for cron-based solutions. It will also be appreciated that even if the characteristics for scheduled jobs remain unchanged, failure of certain jobs may require remediation by a reservation of an additional number of cloud resources to compensate and execute the failed jobs.

Figure 1:
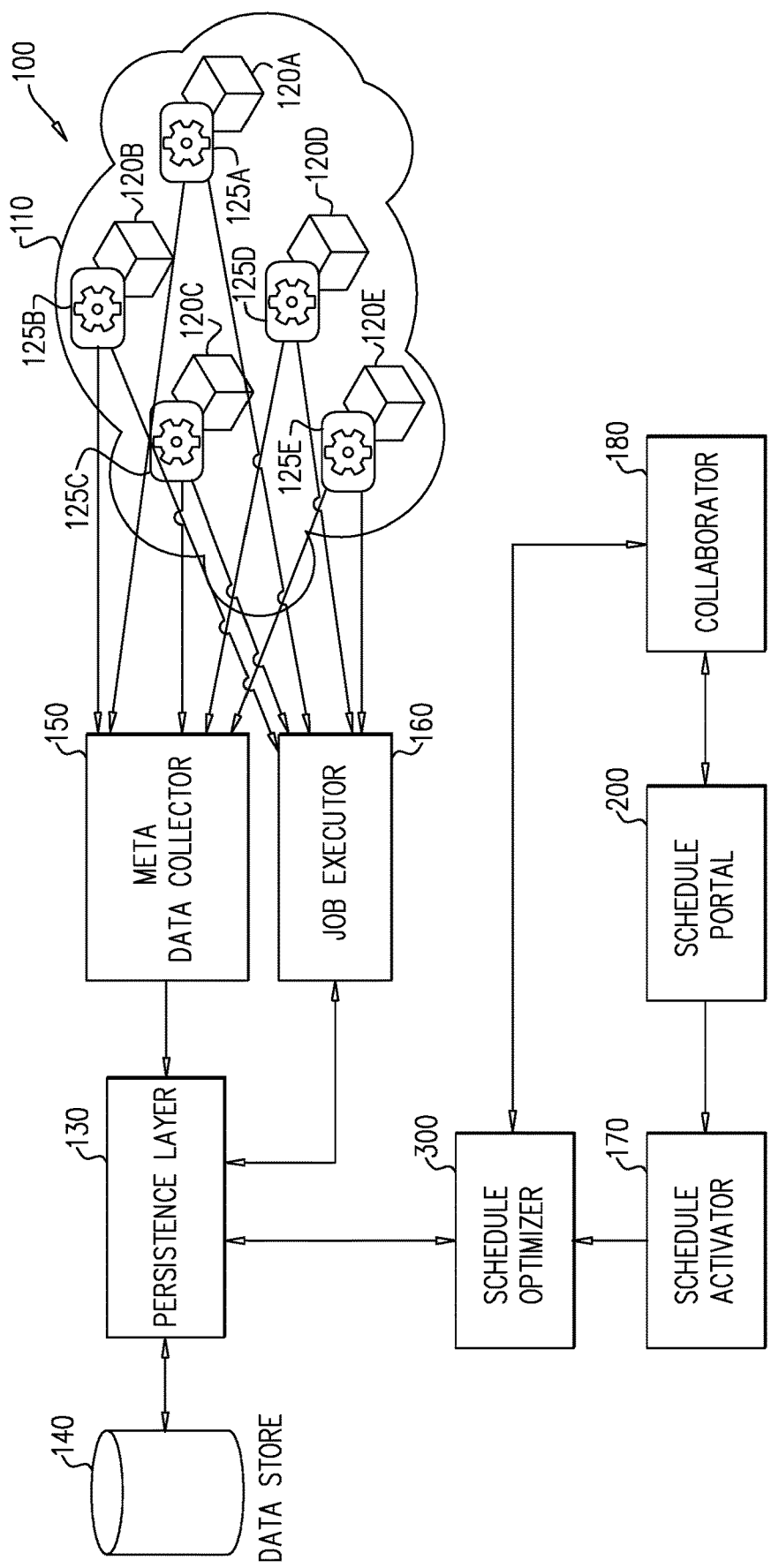
FIG. 1 is a partly-pictorial, partly-block diagram illustration of an exemplary cloud resources optimization system, constructed and operative in accordance with embodiments described herein.

Reference is now made to FIG. 1 which is an illustration of an exemplary cloud resources optimization system 100, constructed and operative in accordance with embodiments described herein. System 100 comprises cloud nodes 120A-E (also collectively referred to herein as "cloud nodes 120") arrayed in cloud 110, persistence layer 130, data store 140, metadata collector 150, job executor 160, and schedule optimizer 300. Schedule optimizer 300 is described below in greater detail, with reference to FIG. 3.

Data store 140 may be implemented as a backend data store to house metadata used for a machine learning model that may be used to infer the intent of given job requests, beyond the bare details of what particular task is to be performed by the requested job. For example, if seven different build requests of a similar definition are scheduled over a period of a week, running on five different servers as cron jobs, the machine learning model may be operative to infer an intent, or goal, of having a daily (or even nightly) build that upon validation allows for the incremental baselining of the associated codebase. The learning model may also be operative to classify jobs (e.g., batch or online) and/or to infer periodicity by leveraging other additional characteristics associated with the job, including the associated cron command. Data store 140 may be implemented using any suitable memory for storing software and/or operational data, such as an optical storage medium, a magnetic storage medium, an electronic storage medium, and/or a combination thereof.

Persistence layer 130 functions as an interface between data store 140 and the other components of system 100. For example, metadata collector 150 may provide aggregated job execution metadata for storage in data store 140 via persistence layer 130. The aggregated job execution metadata is metadata generated for, during, and/or after execution of a job or group of jobs on one or more of cloud nodes 120, e.g., start/end times, completion status, type of job (e.g., online or batch), etc. Metadata collector 150 may be operative to receive the job execution metadata from cloud nodes 120. The job execution metadata may be pushed to metadata collector 150 by optimization agents 125A-E (also collectively referred to herein as "optimization agents 125"), each of which may be provisioned on one of cloud nodes 120.

Optimization agents 125 may be operative to facilitate instrumentation (i.e., provide monitoring and performance measurement) of jobs scheduled to run periodically on cloud nodes 120, thereby deriving the job execution metadata associated with the jobs. Optimization agents 125 may also and control the execution of jobs on cloud nodes 120 as per job details received from job executor 160. Optimization agents 125 may also offer computation power on behalf of cloud nodes 120. As such, optimization agents 125, may also be operative to report on the capacity of the underlying hardware (of cloud nodes 120) and how much of it is being utilized. For example, optimization agent 125A may detect that cloud node 120A may be configured with 512 GB RAM, of which only 64 GB is presently being utilized. Optimization agent 125A may then include an indication of the availability of the excess capacity associated with cloud node 120A in the job performance metadata provided to metadata collector 150.

Job executor 160 may be operative to provide job details and associated scheduling for execution by cloud nodes 120. Job executor 160 may be updated from persistence layer 130 regarding jobs authorized for execution.

Schedule optimizer 300 may be operative to provide and/or instantiate recommendations for better orchestration of the jobs to be executed on cloud nodes 120. In operation, Schedule optimizer 300 may analyze the aggregated job execution metadata stored in data store 140 to generate recommendations to optimize the scheduling of job executions in a time shifted fashion on cloud nodes 120. Schedule optimizer 300 may also be operative to modify or regenerate the recommendations based on feedback received from other components of system 100. Schedule optimizer 300 may be further operative to forward final/accepted recommendations back to persistence layer 130 for implementation by job executor 160.

System 100 may also comprise schedule activator 170, collaborator 180 and schedule portal 200. Schedule portal 200 is described below in greater detail, with reference to FIG. 2. Schedule portal 200 may be implemented as an interactive user interface for presenting recommendations from schedule optimizer for review, modification, and/or approval. Schedule activator 170 may receive recommendations from schedule optimizer 300 and formalize/finalize them for presentation by schedule portal 200. Upon approval of the recommendations via schedule portal 200, schedule activator 170 may notify schedule optimizer 300 which may then provide details of the approved recommendations to persistence layer 130. Collaborator 180 may be operative to provide feedback from schedule portal 200 to schedule optimizer 300, providing input both specific to optimizing a given recommendation, as well as to the internal machine learning model used by schedule optimizer 300 to generate future recommendations.

Figure 2:
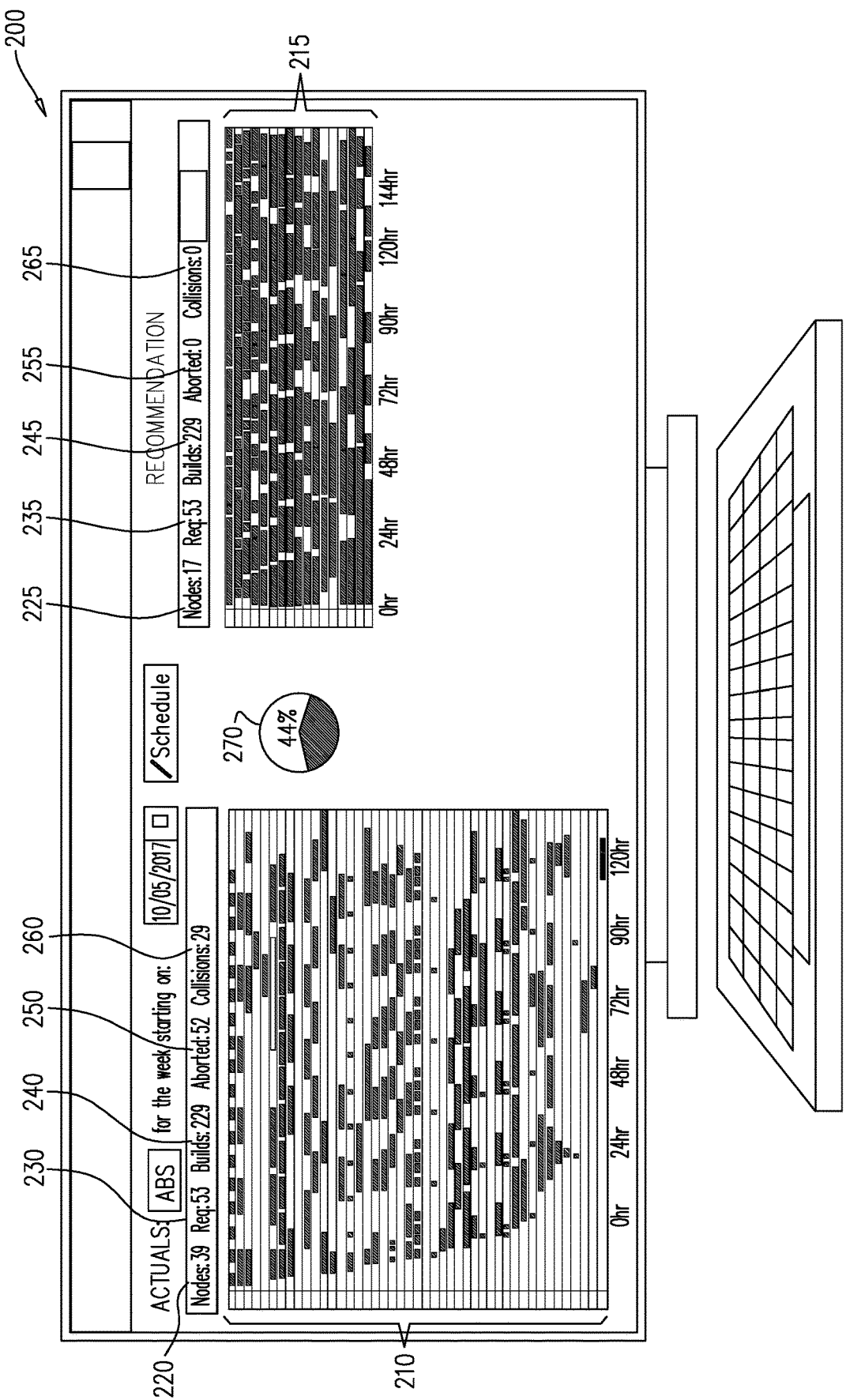
FIG. 2 is a pictorial illustration of an exemplary schedule portal user interface from the system of FIG. 1.

Reference is now also made to FIG. 2 which is a pictorial illustration of an exemplary schedule portal 200 from system 100. As depicted in FIG. 2, schedule portal 200 represents an actual screenshot of a user interface from a pilot implementation of system 100 (FIG. 1). Node schedules 210 represent non-optimized schedules for jobs running on a multiplicity of cloud nodes 120 (FIG. 1), whereas node schedules 215 represent optimized schedules as recommended by schedule optimizer 300 (FIG. 1).

Node count 220, request count 230, build count 240, aborted count 250, and collision count 260 represent actual statistics associated with the performance of jobs in node schedules 210. For example, as per request count 230, fifty-three job requests have been received; and these job requests have been instantiated as, per build count 240, in two hundred and twenty-nine builds which have been scheduled to be executed on 39 cloud nodes (as per node count 220). Aborted count 250 may represent the number of jobs that were aborted (e.g., fifty-two jobs) for whatever reason, and collision count 260 may represent the number of collisions between jobs that are competing for the same resources (e.g., twenty-nine collisions) that were observed in a most recent period of time (e.g., a day, a week, a month, etc.). It will be appreciated that in operation, the period of time for which the observations are made may be configurable.

Node count 225, request count 235, build count 245, aborted count 255, and collision count 265 represent projected statistics associated with the performance of jobs in node schedules 215. Per the example, the values for request count 235 and build count 245 may be the same as request count 230 and build count 240, respectively, thereby reflecting the fact that the number of job requests and resulting builds may be constant across node schedules 210 and 215. However, node count 225 may be significantly lower than node count 220 (e.g., 17 vs. 39) reflecting a significant drop in the number of cloud nodes 120 allocated for the performance of the same number of jobs. As indicated in savings indicator 270, node schedules 215 may entail the allocation of only 44% of the number of cloud nodes 120 allocated for node schedules 210. Aborted count 255 and collision count 165 may represent a projection of zero aborted jobs and collisions for the jobs associated with node schedules 215.

In operation, schedule portal 200 may be employed by a user representing the entity for which the relevant job requests have been submitted. The user may use schedule portal 200 to present scheduling recommendations provided by schedule optimizer 300, and to function as a control utility by providing a user interface for the user to accept or reject the scheduling recommendations. Alternatively, or in addition, schedule portal 200 may be employed by an operator of the cloud service provider.

Figure 3:
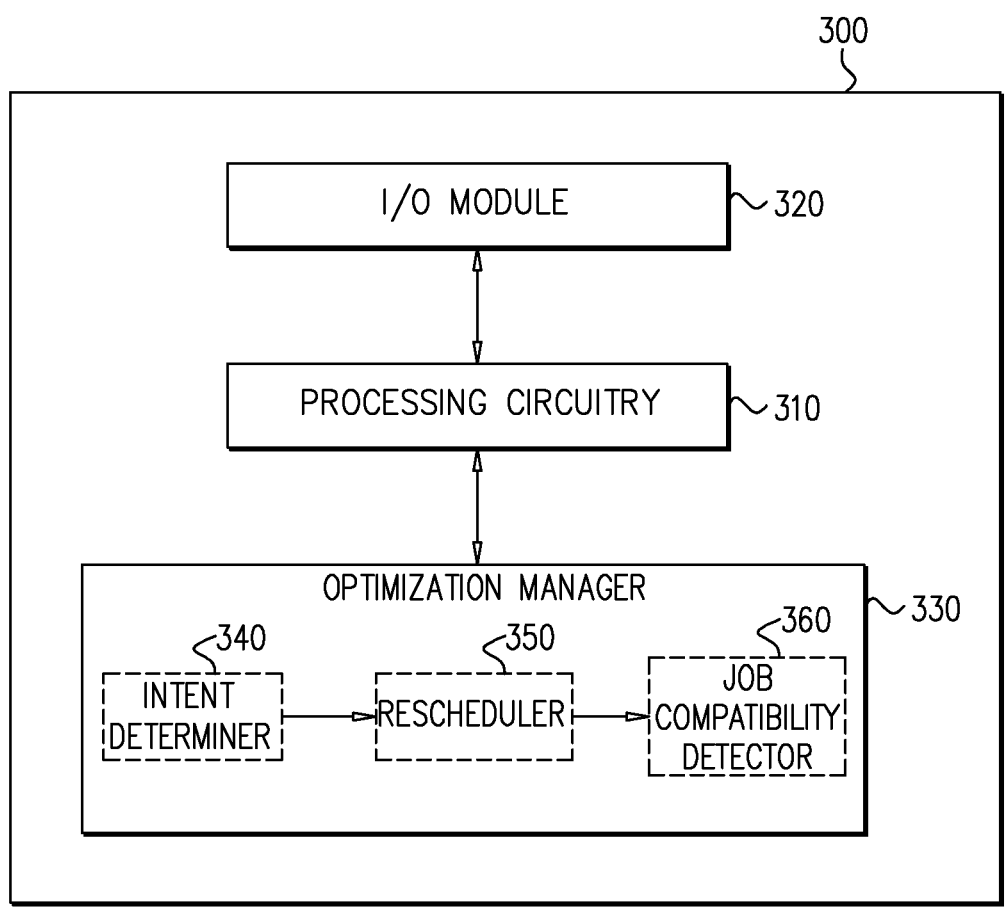
FIG. 3 is a block diagram of an exemplary schedule optimizer from the system of FIG. 1.

Reference is now made also to FIG. 3 which is a block diagram of an exemplary schedule optimizer 300 from system 100 (FIG. 1). Schedule optimizer 300 may be implemented on any suitable computing device such as, for example, a computer server or personal computer. Schedule optimizer 300 comprises processing circuitry 310, input/output (I/O) module 320, and optimization manager 330. Optimization manager 330 may be implemented using a suitable memory for storing software such as, for example, an optical storage medium, a magnetic storage medium, an electronic storage medium, and/or a combination thereof. It will be appreciated that the memory, or parts thereof, may be implemented as a physical component of schedule optimizer 300 and/or as a physical component of one or more secondary devices in communication with schedule optimizer 300. It will also be appreciated that in the interests of clarity, while schedule optimizer 300 may comprise additional components and/or functionality, such additional components and/or functionality are not depicted in FIG. 3 and/or described herein.

Processing circuitry 310 may be operative to execute instructions stored in memory. For example, processor 310 may be operative to execute optimization manager 330. It will be appreciated that processing circuitry 310 may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits. It will similarly be appreciated that schedule optimizer 300 may comprise more than one instance of processing circuitry 310. For example, one such instance of processing circuitry 310 may be a special purpose processor operative to execute optimization manager 330 to perform some, or all, of the functionality of schedule optimizer 300 as discussed with respect to FIG. 1.

I/O module 320 may be any suitable communications component such as a network interface card, universal serial bus (USB) port, disk reader, modem or transceiver that may be operative to use protocols such as are known in the art to communicate either directly, or indirectly, with other elements of system 100, such as, for example, persistence layer 130, schedule activator 170 and/or collaborator 180. For example, I/O module 320 may be operative to use a local area network, a backbone network and/or the Internet, etc. to connect to the other elements of system 100. It will be appreciated that in operation I/O module 320 may be implemented as a multiplicity of modules, where different modules may be operative to use different communication technologies.

It will also be appreciated that the embodiments described herein may also support configurations where some or all of the communications between I/O module 320 and elements of system 100 are brokered by one or more intermediary servers (not depicted) in system 100; at least some of the functionality attributed herein to schedule optimizer 300 may be also performed on such an intermediary server. It will similarly be appreciated that since I/O module 320 is operative to communicate with the other elements of system 100, schedule optimizer 300 may be located remotely; the physical location of schedule optimizer 300 may not necessarily be within close proximity of any specific element(s) of system 100.

Optimization manager 330 may be an application implemented in hardware, firmware, or software that may be executed by processing circuitry 310 to at least provide the functionality of schedule optimizer 300 as described herein to facilitate optimization of job scheduling and execution on nodes 120 (FIG. 1). As depicted in FIG. 3, optimization manager 330 comprises intent determiner 340, rescheduler 350, and job compatibility detector 360.

Intent determiner 340 may be implemented as an independent application or as an internal module of optimization manager 330. In accordance with embodiments described herein, intent determiner 340 may be operative to use the metadata from data store 140 (FIG. 1) as input for the learning model to determine the functional intent of a given job or job request, i.e., to determine characteristics of the underlying utility provided by the requested job(s).

Rescheduler 350 may be implemented as an independent application or as internal module of optimization manager 330. In accordance with embodiments described herein, rescheduler 350 may be operative to orchestrate scheduled jobs to different times, while preserving the intent of the associated job requests as per a determination by intent determiner 340. Rescheduler 350 may therefore time shift the scheduling for job executions in order to provide the underlying utility associated with the a given job, while conserving cloud resources by generating a more efficient "packing" of the jobs on cloud nodes 120.

Rescheduler 350 may employ any suitable algorithm for time shifting the job execution schedules. For example, rescheduler 350 may use a "brute force" approach where various arrangements for packing jobs may be used in an attempt to maximize node utilization. Known or proprietary defragmentation algorithms may also be used by rescheduler 350 to time shift the job execution schedules.

For example, in a non-optimized environment, if three job requests are received, where each of the job requests is for a job to be run at the same time every day with an estimated duration of eight hours, each may be scheduled for execution on separate cloud nodes 120, e.g., cloud node 120A, cloud node 120B, and cloud node 120C. In such a case, intent determiner 340 may determine that the intent of the job requests is for each job to run on a daily basis, where the time of day may be of lesser importance. In light of this determination by intent determiner 340, rescheduler 350 may reschedule the requested started time of the three jobs in order to schedule each of the three jobs to run back to back on a single cloud resource (e.g., just one of cloud node 120A, cloud node 120B, and cloud node 120C). In such manner, rescheduler 350 may optimize the use of cloud nodes 120 while still providing the underlying utility of the three job requests by maintaining the desired job periodicity of running each job every twenty-four hours.

It will be appreciated that the above example, once other criteria such as the scale of cloud resources, the number of jobs requested, the variation of time to completion, as well as the failures of jobs and/or cloud resources are considered may become increasingly challenging to maintain without the automated intelligence provided by system 100. Rescheduler 350 enables schedule optimizer 300 to not only allocate resources for job execution, but also determines when the jobs should be executed, thereby efficiently reducing total resource usage by understanding the underlying intent behind an original job request and time shifting tasks at hand.

Job compatibility detector 360 may be implemented as an independent application or as internal module of optimization manager 330. In accordance with embodiments described herein, job compatibility detector 360 may be operative to detect finding evidence of co-existing jobs on cloud nodes 120, and enable the implementation of similar job execution patterns on other cloud nodes 120 during orchestration.

Job compatibility detector 360 may be operative to detect co-location of different concurrent jobs. Observed success in execution of these co-located jobs may then be leveraged by rescheduler 350 to employ a similar co-located/concurrent job pattern in another situation with similar constraints. For example, job compatibility detector 360 may detect cron job A and cron job B successfully running concurrently on cloud node 120A, cron job A running on cloud node 120B, and cron job B running on cloud node 120C. Based on the pattern detected by job compatibility detector 360, rescheduler 350 may then schedule both cron job A and cron job B to concurrently run on a single cloud node 120 (e.g., cloud node 120B) thereby freeing up the remaining cloud node 120 (e.g., cloud node 120C) for other tasks.

It will be appreciated that the depiction of intent determiner 340, reschedule 350, and job compatibility detector 360 as discrete components of optimization manager 330 is exemplary. The embodiments described herein also support integration of some or all of the functionality of intent determiner 340, reschedule 350, and job pattern detector 360 within a single component.

It will similarly be appreciated that the other components of system 100 as depicted in FIG. 1 may also be implemented on computer devices configured in a manner similar to schedule optimizer 300. For example, cloud nodes 120, metadata collector 150, job executor 160, schedule activator, collaborator 180 and schedule portal 200 may also comprise processing circuitry similar to processing circuitry 310, I/O modules similar to I/O module 320, and applications implemented in software, hardware and/or firmware that may be executed by processing circuitry to provide the functionality described herein with respect to the components of system 100.

Figure 4:
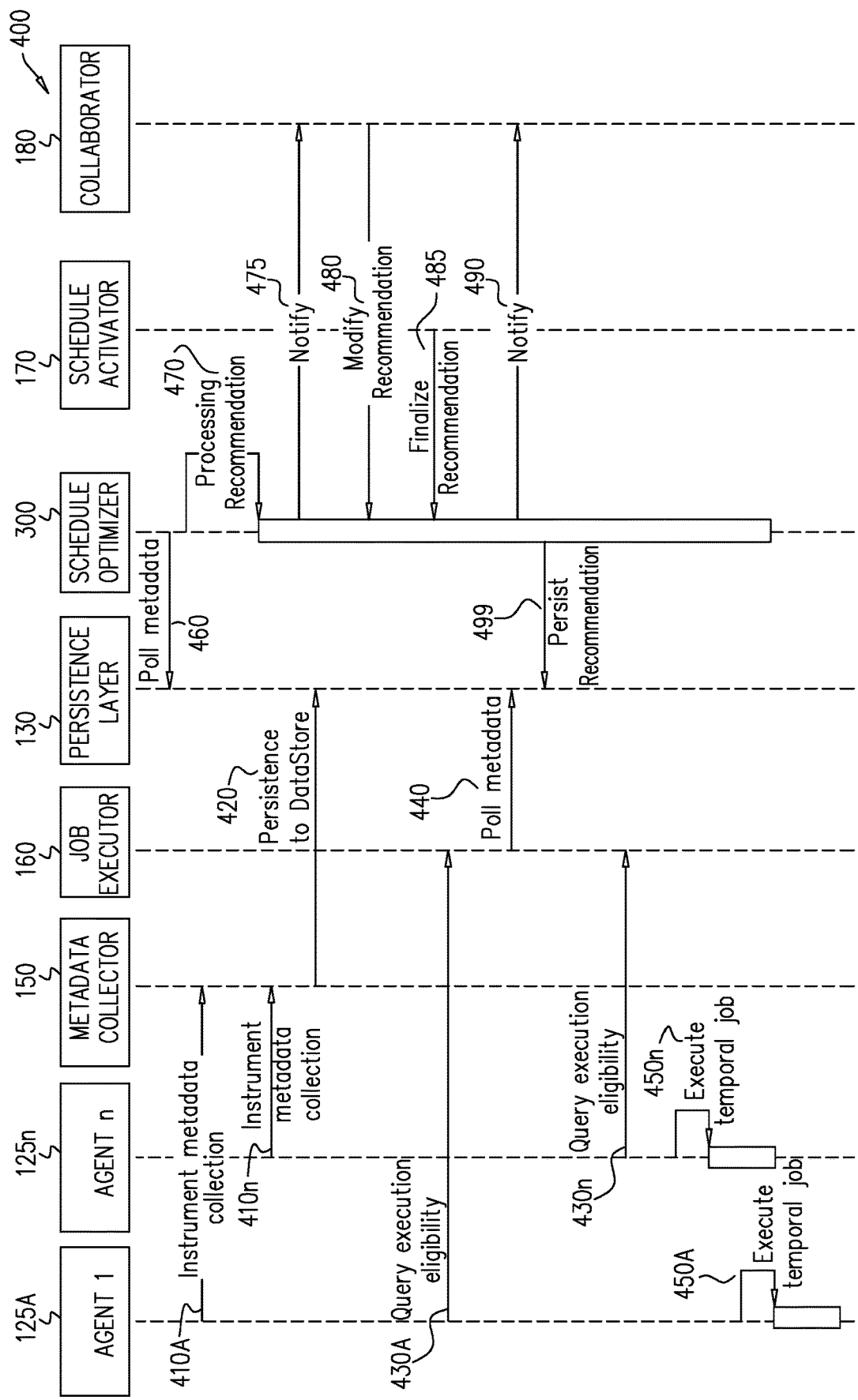
FIG. 4 is an exemplary process flow to be performed by the system of FIG. 1.

Reference is now made to FIG. 4 which is an illustration of an exemplary process flow 400 to be performed by the components of system 100 of FIG. 1. The components of system 100 will be referred to herein as per the reference numerals in FIG. 1. It will be appreciated that while in operation, system 100 may concurrently run jobs on cloud nodes 120 according to a schedule while optimizing the schedule in parallel processes. Accordingly, as depicted in FIG. 4, steps 410-450 may address activity associated primarily with job execution on cloud nodes 120, and steps 460-499 may address activity associated with job schedule optimization.

Optimization agents 125 (representatively depicted in FIG. 4 as agents "1" and "n") may collect (steps 410A-410N) metadata from the execution of jobs on cloud nodes 120. Such metadata may be associated with, for example, type of the job (e.g., batch or online), scheduled time of execution, actual start time, duration of execution, completion status (e.g., successful, aborted, collision), required resources, interdependencies with other jobs, the number of targets to be built, build profile variants (e.g., long comprehensive set, vs short set vs experimental set), execution periodicity, the code branch for the build, etc. Metadata collector 150 may collect (step 420) this metadata and provide it to persistence layer 130 for storage in data store 140. It will be appreciated that metadata collector 150 may also be operative to collect relevant metadata from sources other than optimization agents 125. For example, some job execution metadata may be collected from routers servicing cloud nodes 120.

Optimization agents 125 may query (steps 430A-430N) job executor 160 for jobs to schedule for execution on cloud nodes 120. Job executor may poll (step 440) persistence layer 130 for jobs to schedule on cloud nodes 120. Based on job scheduling information received from job executor, optimization agents 125 may instruct cloud nodes 120 to execute (steps 450A-450N) jobs according to a temporal schedule as received from job executor 160.

In parallel with the activity associated with job execution on cloud nodes 120, schedule optimizer 300 may poll (step 460) persistence layer 130 for job execution metadata stored in data store 140. Schedule optimizer 300 may then process (step 470) the job execution metadata to produce a recommendation for optimizing a schedule for job execution. It will be appreciated that the performance of step 470 may employ some, or all, of the functionality described hereinabove with respect to FIG. 3 and the functionality of rescheduler 350 to reschedule job executions as per determinations made by intent determiner 340 and/or job compatibility detector 360.

Schedule optimizer 300 may notify (step 475) collaborator 180 with the details of the recommendation produced in step 470. In response, collaborator 180 may return (step 480) to schedule optimizer modifications for the recommendations as per input received from schedule portal 200. For example, a user reviewing the recommendation in schedule portal 200 may reject changes to the previous schedule and/or add/change job constraints. It will be appreciated that steps 470-480 may be run as an iterative process, with schedule optimizer 300 progressively refining a recommended schedule in light of input received from collaborator 180.

When the recommended schedule is approved by a user/operator in schedule portal 200, schedule activator may then send (step 485) the finalized (i.e., approved) recommendation to schedule optimizer 300. Alternatively, system 100 may be configured to run autonomously without necessitating user/operator approval in schedule portal 200. Alternatively, system 100 may be configured to accept recommendations from schedule optimizer 300 by default unless explicitly rejected in schedule portal 200. For example, schedule portal 200 may be configured to present recommendations from schedule optimizer 300, and autonomously accept the recommendations unless an explicit rejection is input to schedule portal 200 within a configurable time period.

Schedule optimizer 300 may then notify (step 490) collaborator 180 with the details of the finalized recommendation which may server as input for a future iteration of steps 470-480.

It will be appreciated that process 400 may be run on a periodic basis, e.g., hourly, daily, weekly, etc. Process 400 may also be run reactively in response to a trigger situation. For example, process 400 may be run when a predefined percentage of cloud network resources (e.g., cloud nodes 120 and/or peripheral devices) have been scheduled for a given point in time. Process 400 may also be run in response to a request input by an operator of system 100.

In summary, the embodiments described herein may provide increased efficiency in the operation of cloud resource (e.g., cloud nodes 120), which may translate to either reduced usage of the cloud resources, and/or provide increased computing capacity by effectively shrinking the consumption footprint for an existing load of jobs. System 100 may accomplish this by intelligently understanding the underlying intent of job requests and recommending an optimized schedule by taking into account the reality of dynamicity of characteristics associated with jobs such as failure rate, duration to completion, co-location and concurrency with other jobs.

It will be appreciated that while the descriptions herein have referenced the use of cron setup with Linux-based nodes, the embodiments described may support other computing environments. For example, cron setup may be supported with other Unix-based operating systems. Similarly, the embodiments described may support job scheduling utilities other than cron setup.

It is appreciated that software components of the embodiments of the disclosure may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the disclosure.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable subcombination.

It will be appreciated by persons skilled in the art that the embodiments of the disclosure are not limited by what has been particularly shown and described hereinabove. Rather the scope of the embodiments of the disclosure is defined by the appended claims and equivalents thereof:

What is claimed is:
1. A system comprising:
a plurality of cloud nodes implemented on computing devices comprising one or more processors, said plurality of cloud nodes configured to execute jobs associated with job requests in a cloud computing environment according to a schedule;

a schedule optimizer configured to:
 use a machine learning model to determine functional intent for said job requests according to at least job execution metadata, and
 generate a schedule recommendation for said jobs, wherein said schedule recommendation is generated based at least in part on said functional intent;
a job executor configured to provide said schedule recommendation as said schedule to said plurality of cloud nodes, wherein said schedule optimizer and said job executor are instantiated in memory and executed by processing circuitry on at least one computing device; and
a schedule portal user interface configured to:
 present a representation of said schedule;
 present a representation of said schedule recommendation; and
 receive a user input indicative of an acceptance or a rejection of said schedule recommendation;
wherein upon determining that said user input is indicative of said acceptance of said schedule recommendation, said schedule optimizer is configured to indicate to said job executor to provide said schedule recommendation as a replacement schedule to said plurality of cloud nodes.

2. The system according to claim 1, wherein said schedule optimizer comprises:
a job compatibility detector configured to detect at least two jobs with given characteristics running concurrently on a first cloud node of said plurality of cloud nodes;
wherein said schedule optimizer is further configured to:
 detect at least two other jobs with said given characteristics, and
 schedule said at least two other jobs to run concurrently on a second cloud node of said plurality of cloud nodes in accordance with said schedule recommendation.

3. The system according to claim 1, wherein said schedule portal user interface is configured to modify said schedule recommendation in response to a user input indicative of a modification of said schedule recommendation.

4. The system according to claim 3, wherein said schedule optimizer is configured to use said user input indicative of said modification of said schedule recommendation as an input to said machine learning model.

5. The system according to claim 1, wherein said job execution metadata includes at least an indication of a job type, wherein said job type is at least one of batch or online.

6. The system according to claim 1, wherein said job execution metadata includes at least an indication of job periodicity.

7. The system according to claim 1, wherein said job execution metadata includes at least a job duration.

8. The system according to claim 1, wherein said job execution metadata is received from one or more agents on said plurality of cloud nodes.

9. The system according to claim 1, wherein said schedule optimizer comprises a rescheduler configured to time shift said jobs associated with said job requests to a different time than requested in said job requests, wherein said different time is in accordance with constraints consistent with said functional intent.

10. A method for optimizing cloud network resources, the method implemented on at least one computing device and comprising:

receiving job requests for jobs to be run on a plurality of cloud network nodes;
receiving job execution metadata, wherein said job execution metadata is associated with previously run jobs on said plurality of cloud network nodes;
using a machine learning model to determine functional intent for said job requests according to at least said job execution metadata;
generating a recommended schedule for said jobs to be run on said plurality of cloud network nodes, wherein said recommended schedule is generated according to at least said functional intent;
presenting a representation of at least said recommended schedule on a user interface;
receiving a user input indicative of an acceptance or a rejection of said recommended schedule; and
upon determining that said user input is indicative of said acceptance of said recommended schedule, providing said recommended schedule to said plurality of cloud network nodes as a replacement schedule for said jobs to be run on said plurality of cloud network nodes.

11. The method according to claim 10, wherein said generating comprises:
time shifting said jobs to be run on said plurality of cloud network nodes to a different time than requested in said job requests, wherein said different time is in accordance with constraints consistent with said functional intent.

12. The method according to claim 10, wherein said generating comprises:
detecting from among said jobs to be run on a plurality of cloud network nodes at least two jobs with given characteristics running concurrently on a first cloud network node of said plurality of cloud network nodes;
detecting at least two other jobs with said given characteristics; and
scheduling said at least two other jobs to run concurrently on a second cloud network nodes in accordance with said recommended schedule.

13. The method according to claim 10, further comprising:
receiving a user input indicative of a modification of said recommended schedule; and
modifying said recommended schedule in accordance to said user input indicative of said modification of said recommended schedule.

14. The method according to claim 13, further comprising using said user input indicative of said modification of said recommended schedule as input to said machine learning model.

15. A method comprising:
using a machine learning model to determine functional intent for job requests according to at least job execution metadata;
generating a recommended schedule for jobs to be run on a plurality of cloud nodes configured to execute said jobs in a cloud computing environment according to a schedule, wherein said recommended schedule is generated according to at least said functional intent;
presenting a representation of at least said recommended schedule on a user interface;
receiving a user input indicative of an acceptance or a rejection of said recommended schedule; and
upon determining that said user input is indicative of said acceptance of said recommended schedule, providing said recommended schedule to said plurality of cloud nodes as a replacement schedule for said schedule for said jobs.

16. The method according to claim 15, further comprising:
    detecting from among said jobs at least two jobs with given characteristics running concurrently on a first cloud node of said plurality of cloud nodes;
    detecting at least two other jobs with said given characteristics; and
    scheduling said at least two other jobs to run concurrently on a second cloud node of said plurality of cloud nodes in accordance with said recommended schedule.

17. The method according to claim 15, wherein said generating comprises:
    time shifting said jobs to a different time than requested in said job requests, wherein said different time is in accordance with constraints consistent with said functional intent.

18. The method according to claim 15, further comprising:
    receiving a user input indicative of a modification of said recommended schedule; and
    modifying said recommended schedule in accordance with said user input indicative of said modification of said recommended schedule.

19. The method according to claim 18, further comprising:
    using said user input indicative of said modification of said recommended schedule as input to said machine learning model.

20. The method according to claim 15, wherein said job execution metadata includes at least an indication of a job type, wherein said job type is at least one of batch or online.

* * * * *